US008360882B2

(12) United States Patent
Liu

(10) Patent No.: US 8,360,882 B2
(45) Date of Patent: Jan. 29, 2013

(54) GAME CONTROLLER

(75) Inventor: Yalong Liu, Causeway bay (HK)

(73) Assignee: E-Core (HK) Limited, Causeway Bay (HK)

( * ) Notice: Subject to any disclaimer, the term of this patent is extended or adjusted under 35 U.S.C. 154(b) by 391 days.

(21) Appl. No.: 12/653,351

(22) Filed: Dec. 11, 2009

(65) Prior Publication Data

US 2011/0098116 A1     Apr. 28, 2011

(30) Foreign Application Priority Data

Oct. 23, 2009    (CN) ...................... 2009 2 0218033 U

(51) Int. Cl.
*A63F 9/24*          (2006.01)
(52) U.S. Cl. ........................................... 463/37; 463/47
(58) Field of Classification Search .................... 463/47, 463/37; 439/39, 43, 46, 54–55
See application file for complete search history.

(56) References Cited

U.S. PATENT DOCUMENTS

2005/0255915 A1*    11/2005    Riggs et al. ..................... 463/37

OTHER PUBLICATIONS

"DIN Connector meets industrial application requirements." news.thomasnet.com. Online. Dec. 12, 2006. Accessed via the Internet. Accessed Feb. 22, 2012. <URL: http://news.thomasnet.com/fullstory/DIN-Connector-meets-industrial-application-requirements-500690>.*

* cited by examiner

*Primary Examiner* — Dmitry Suhol
*Assistant Examiner* — Carl V Larsen
(74) *Attorney, Agent, or Firm* — Raymond Y. Chan; David and Raymond Patent Firm

(57) ABSTRACT

A game controller includes a casing, a control circuit module received in the casing, a plurality of controlling units embodying as a left control stick, a direction key, a function key, and a right control stick respectively, wherein at least two of the controlling units form as two interchangeable controlling units respectively which are detachable from the casing. A plurality of terminal seats are spacedly provided on the casing for detachably retaining the interchangeable controlling units in position, wherein the number of the terminal seats are corresponding to the number of the interchangeable controlling units to be interchangeably mounted at the casing. The interchangeable controlling units are detachably coupled at the terminal seats to electrically connect to the control circuit module. The positions of the interchangeable controlling units are interchanged according to the game setting and players' habits.

13 Claims, 7 Drawing Sheets

GAME CONTROLLER

BACKGROUND OF THE PRESENT INVENTION

1. Field of Invention

The present invention relates to an electronic game accessory, and more particularly to a gamepad.

2. Description of Related Arts

Currently, the electronic game becomes a common entertainment in our daily life. As one of the most important accessories in electronic game, the gamepad has been continuously improved to satisfy the game player's request. For current using gamepad, the control elements such as joystick, function keys, direction keys are all fixed on the shell of the gamepad. While for different games (such as shooting games and fighting games), the control operation and key configuration are largely different. As a result, the players have to buy different gamepads for different types of game. In addition, each player has his/her own habit to play games (for example, left-handed or right-handed). But the control elements are fixed on the body of gamepad and are not adjustable, which is very inconvenient for the players with different habits.

SUMMARY OF THE PRESENT INVENTION

An object of the present invention is to overcome the disadvantages of currently used gamepads, and to provide a game controller which the control units thereof can be relocated as request.

Accordingly, in order to accomplish the above object, the present invention provides a game controller, comprising a casing, a control circuit module received in the casing, a plurality of controlling units embodying as a left control stick, a direction key, a function key, and a right control stick respectively, wherein at least two of the controlling units form as two interchangeable controlling units respectively which are detachable from the casing. A controller interchanging arrangement comprises two or more terminal seats spacedly provided on the casing for detachably retaining the interchangeable controlling units in position, wherein the number of the terminal seats are corresponding to the number of the interchangeable controlling units to be interchangeably mounted at the casing.

Each of the terminal seats comprises a plurality of first connectors electrically extended from the control circuit module. Each of the controlling units comprises a plugging body detachably coupling with one of the terminal seats, and a second connector provided at the plugging body to electrically couple with the corresponding first connector when the plugging body is engaged with the terminal seat.

According to the game controller as mentioned above, the terminal seats have the same arrangement of the first connectors.

According to the game controller as mentioned above, each terminal seat comprises a first positioning means, and each plugging body comprises a second positioning means coupled with the first positioning means to ensure the correct alignment between the terminal seat and the plugging body.

According to the game controller as mentioned above, the first positioning means comprises a positioning ridge comprises vertically protruding from the side wall of the terminal seat, wherein the second positioning means comprises a positioning slot vertically formed on the outer wall of the side wall of the plugging body for the positioning ridge slidably engaging with the positioning slot.

According to the game controller as mentioned above, the first connectors are positioned on the bottom of each of the terminal seats, wherein the second connectors are positioned on the bottom of the plugging bodies respectively.

According to the game controller as mentioned above, both the first connector and the second connector are contact terminals to electrically connect with each other when the first and second connectors are electrically contacted with each other.

According to the game controller as mentioned above, the terminal seat and the plugging body are both in cylindrical shape.

According to the game controller as mentioned above, the left control stick, the direction key, the function key and the right control stick are all selectable to be the interchangeable controlling units which are detachable from the casing.

According to the game controller as mentioned above, each terminal seat comprises four first connectors located in the four quadrants respectively.

According to the game controller as mentioned above, the casing comprises one or two handle bodies having an anti-skipping layer made of soft rubber material on outer side with protruding patterns.

The advantages of the game controller of the present invention are: at least two controlling units selected from the left control stick, direction key, function key, and right control stick are embodied as the interchangeable controlling units which are detachable from the casing. The positions of the interchangeable controlling units can be interchanged according to the game setting and players' habits.

These and other objectives, features, and advantages of the present invention will become apparent from the following detailed description, the accompanying drawings, and the appended claims.

DETAILED DESCRIPTION OF THE PREFERRED EMBODIMENT

Figure 1:
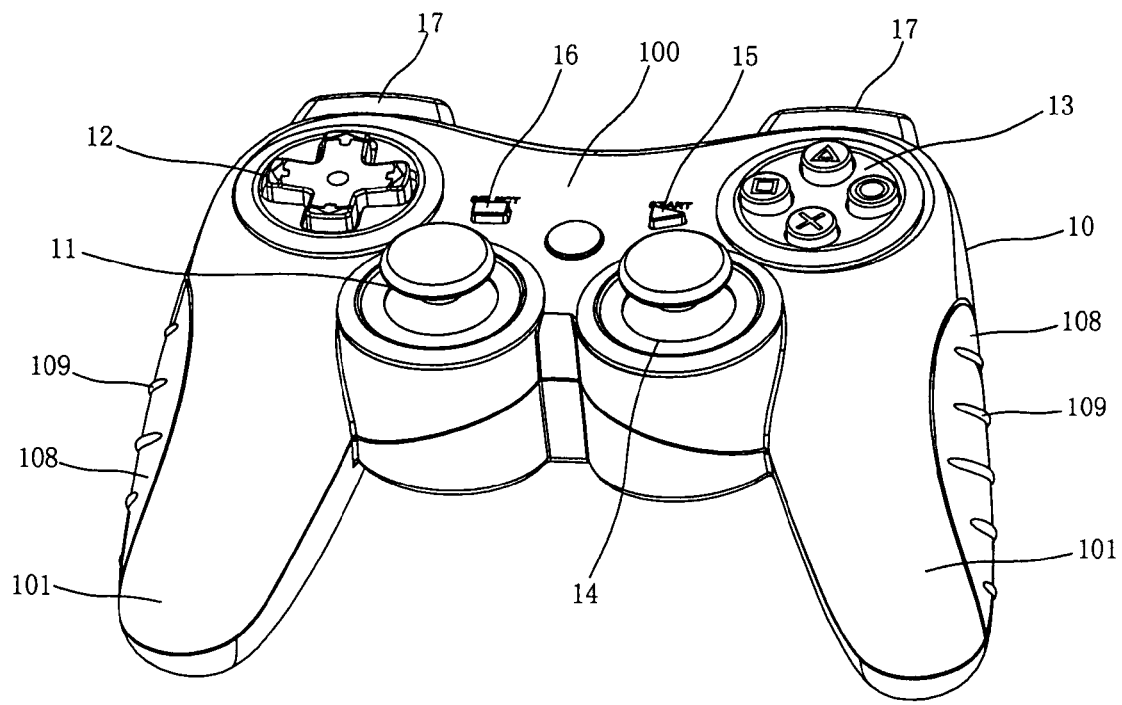
FIG. 1 is a perspective view of the game controller according to a first preferred embodiment of the present invention.
Figure 2:
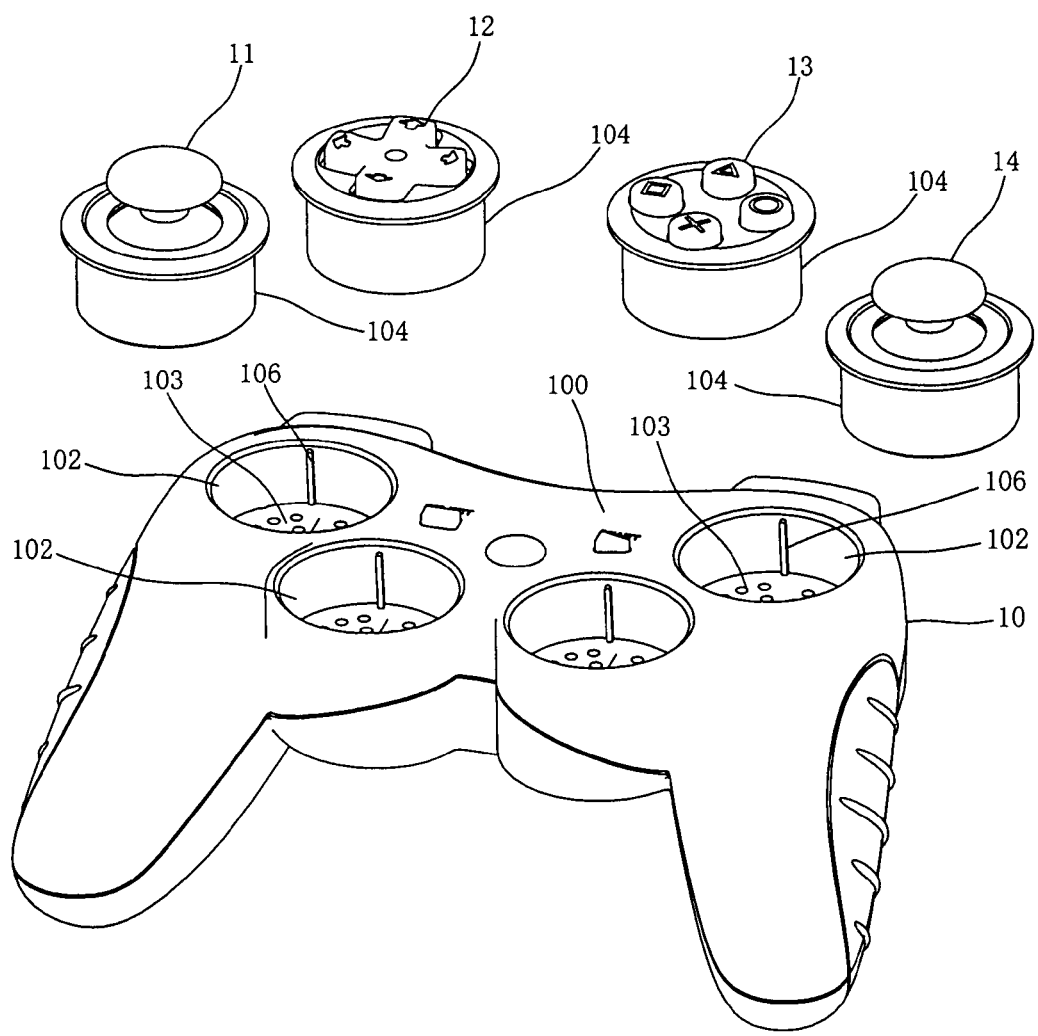
FIG. 2 is an exploded perspective view of the game controller according to the above first preferred embodiment of the present invention.
Figure 3:
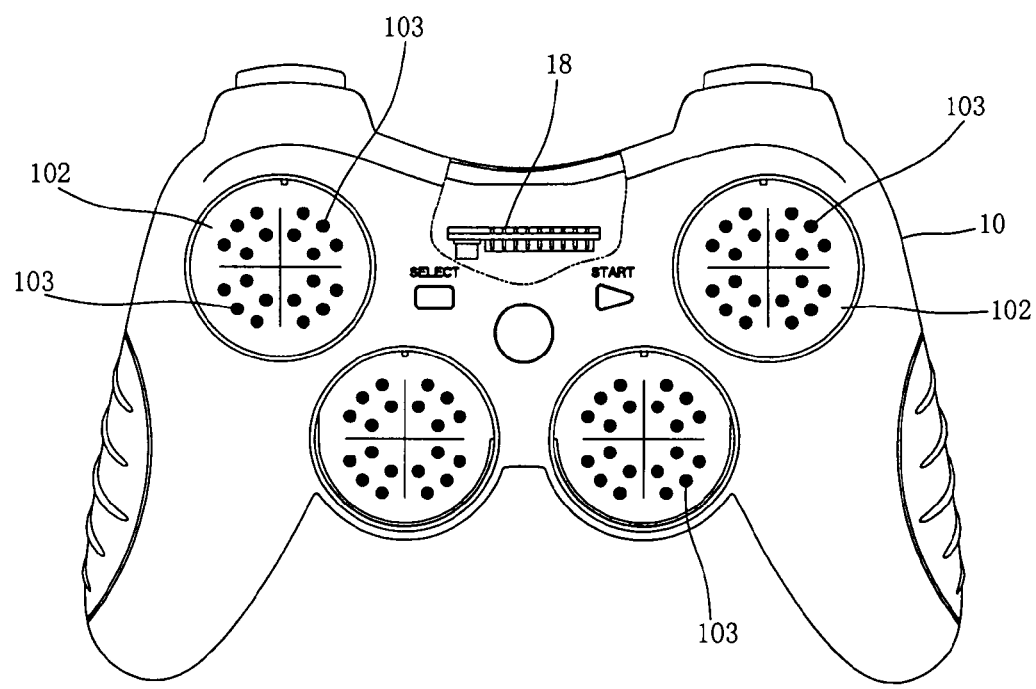
FIG. 3 is a schematic view of the casing of the game controller according to the above first preferred embodiment of the present invention.
Figure 4A:
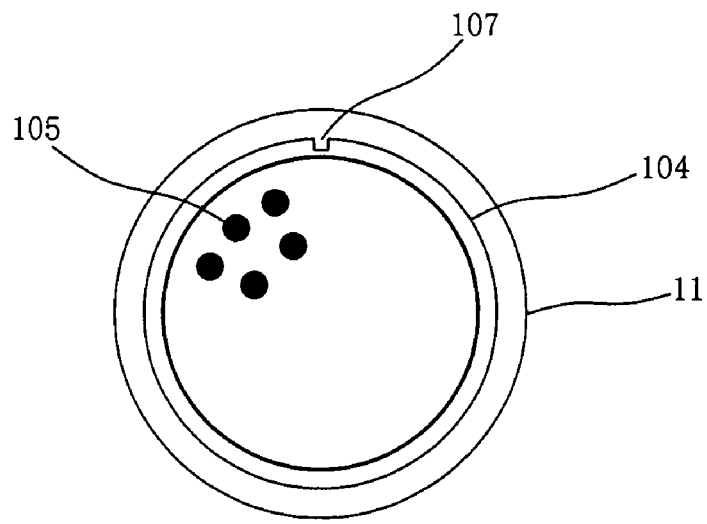
FIGS. 4*a* to 4*d* are bottom views of the left control stick, direction key, function key, and right control stick respectively of the game controller according to the above first preferred embodiment of the present invention.
Figure 4B:
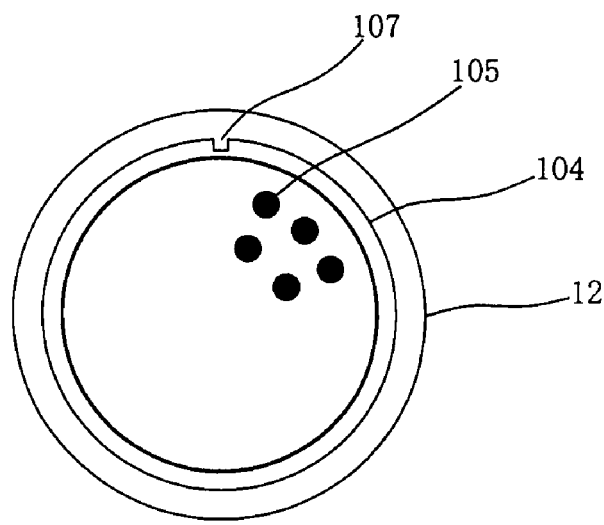
Figure 4C:
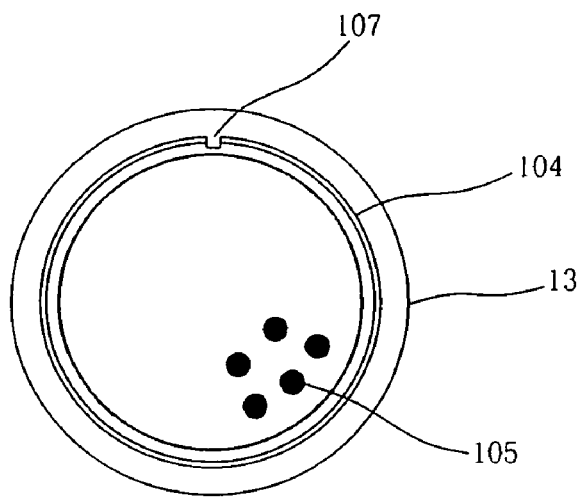
Figure 4D:
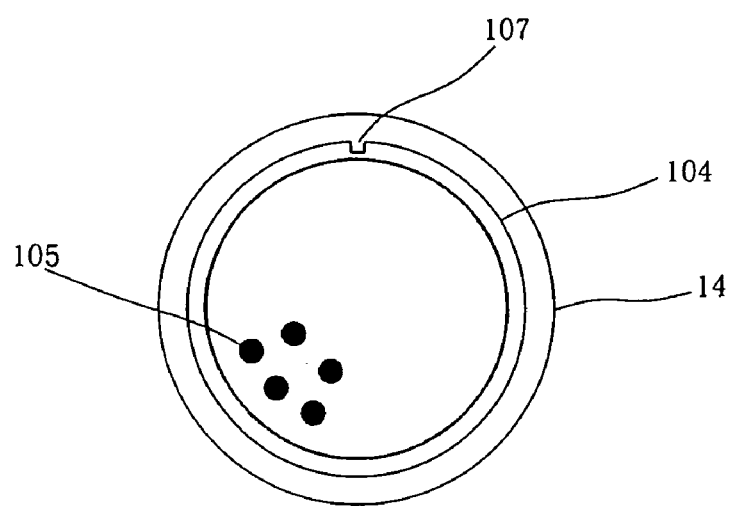

Referring to FIGS. 1 to 4*d* of the drawings, a game controller according to a first embodiment of the present invention is illustrated, wherein the game controller comprises a casing 10, such as a hand-held casing, which comprises a main body 100, and two spaced apart handle bodies 101 extending downwardly from the two sides of the main body 100. The game controller further comprises a control circuit module 18 supported within the casing 10, wherein the control circuit module 18 is adapted to communicatively connect to a game console via a wireless communication, such as "Bluetooth", or a wired communication such as USB to send the control signal from the game controller to the game console for playing the electronic game.

The game controller further comprises a plurality of controlling units provided at the casing 10 to electrically connect to the control circuit module 18, wherein the controlling units are preferably embodied as a left control stick 11, a direction key 12, a function key 13, and a right control stick 14, a START key 15, a SELECT key 16, and a plurality of firing keys 17 respectively. Accordingly, at least two of the controlling units are embodied as the interchangeable controlling units. The game controller further comprises a controller interchanging arrangement for detachably retaining the interchangeable controlling units at the casing 10. Accordingly, at least the left control stick 11, the direction key 12, the function key 13, and the right control stick 14 can be set as four interchangeable controlling units which are detachable from the casing 10. The controller interchanging arrangement comprises a plurality of terminal seats 102 spacedly provided at the main body 100 of the casing. Accordingly, there are four terminal seats 102 spacedly formed at the main body 100, wherein each of the terminal seats 102 has a cylindrical shape indented on the main body 100 to form a cavity thereat for receiving the interchangeable controlling unit. Each of the terminal seats 102 further comprises a plurality of first connectors 103, preferably four sets of connectors, provided at the bottom wall of the terminal seat 102, wherein the first connectors 103 are electrically extended from the control circuit module 18. Accordingly, the four sets of first connectors 103 are arranged to electrically couple with the four interchangeable controlling units, i.e. the left control stick 11, the direction key 12, the function key 13, and the right control stick 14, respectively. In other words, each set of the first connectors 103 is correspondingly aligned to couple with the respective interchangeable controlling unit, wherein each set contains at least one of the first connectors 103. Therefore, the number of set of the first connectors 103 is corresponding to the number of the interchangeable controlling units. Each of the interchangeable controlling units further comprises a cylindrical plugging body 104 detachably sliding into the terminal seat 102, and at least a second connector 105 provided at a bottom side of the plugging body 104 such that when the plugging body 104 is detachably engaged with the respective terminal seat 102, the second connector 105 is electrically engaged with one of the first connectors 103 of the respective terminal seat 102. Therefore, when the four plugging bodies 104 of the interchangeable controlling units are selectively and detachably engaged with the four terminal seats 102, the four second connectors 105 of the interchangeable controlling units are correspondingly engaged with four different first connectors 103 respectively. Consequently, the interchangeable controlling units are electrically connected with the control circuit module 18 to form a complete functional game controller.

Accordingly, the four terminal seats 102 have the same quadrant arrangement of the first connectors 103 to be distributed. For example, the four sets of first connectors 103 are arranged in four different quadrants. In other words, the number of quadrants at each of the terminal seats 102 is corresponding to the number of the interchangeable controlling units. The first quadrant of the terminal seat 102 is assigned to the first connector 103 for connecting the left control stick 11. The second quadrant of the terminal seat 102 is assigned to the first connector 103 for connecting the direction key 12. The third quadrant of the terminal seat 102 is assigned to the first connector 103 for connecting the function key 13. The forth quadrant of the terminal seat 102 is assigned to the first connector 103 for connecting the right control stick 14. Correspondingly, the left control stick 11 has its corresponding second connector 105 located on the first quadrant of the bottom of the plugging body 104 thereof corresponding to the first connector 103 on the first quadrant of the bottom of the terminal seat 102. The function key 13 has its corresponding second connector 105 located on the second quadrant of the bottom of the plugging body 104 thereof corresponding to the first connector 103 on the second quadrant of the bottom of the terminal seat 102. The direction key 12 has its corresponding second connector 105 located on the third quadrant of the bottom of the plugging body 104 thereof corresponding to the first connector 103 on the third quadrant of the bottom of the terminal seat 102. The right control stick 14 has its corresponding second connector 105 located on the forth quadrant of the bottom of the plugging body 104 thereof corresponding to the first connector 103 on the forth quadrant of the bottom of the terminal seat 102.

Preferably, the first connectors 103 at the bottom of the terminal seats 102 and the second connectors 105 at the bottom of the plugging bodies 104 are contact terminals such that the first connector 103 is electrically contacted with the second connector 105 for electrical connection. Alternatively, other types of connectors are also available.

In the preferred embodiment, the first connectors 103 are located on the bottom of the terminal seats 102, and the second connectors 105 are located on the bottom of the plugging bodies 104. Obviously, the locations of the first and second connectors 103, 105 are not limited to these locations. For example, the first connectors 103 can be placed at the side wall of the terminal seats 102, and the second connector 105 can be placed at the side wall of the plugging body 104 of the interchangeable controlling units correspondingly.

The terminal seat 102 further comprises a positioning ridge 106 protruding vertically from the side wall thereof. The plugging body 104 of the interchangeable controlling units further comprises a positioning slot 107 indently formed on the side wall thereof corresponding to the positioning ridge 106 of the terminal seat 102. When the interchangeable controlling unit is installed into the terminal seat 102, the positioning ridge 106 is slidably coupled with the positioning slot 107 to guide the installation of the interchangeable controlling unit relating to the terminal seat 102. By the coupling of the positioning ridge 106 and the positioning slot 107, the relative position of the plugging body 104 and the terminal seat 102 are guaranteed to ensure the electrical connection between the first and second connectors 103, 105. Obviously, other methods of positioning can also be used. For example, forming positioning holes on the bottom of the terminal seat 102, and forming positioning poles on the bottom of the plugging body 104 correspondingly. In other words, the positioning hole and pole configuration can be used for positioning and aligning the connection between the first and second connectors 103, 105.

Preferably, the handle bodies 101 of the casing 10 comprise an anti-slipping layer 108 made of soft rubber material on the outer sides thereof, wherein the anti-slipping layer 108 has protruding patterns 109. The anti-slipping layer 108 helps the player to hold the handle bodies 101, and to improve the hand feeling for holding.

Figure 5:
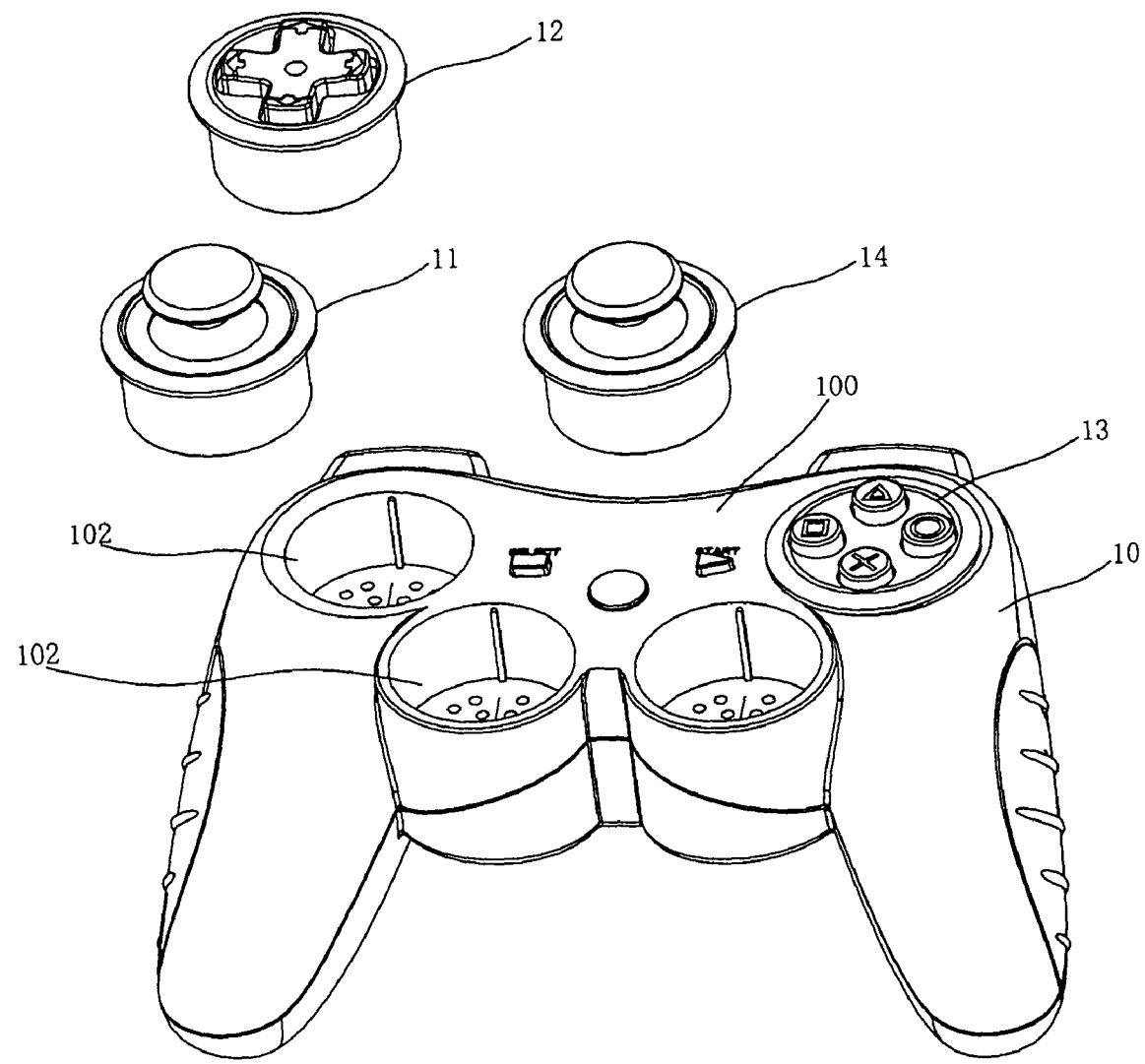
FIG. 5 is an exploded perspective view of the game controller according to a second preferred embodiment of the present invention.

As shown in FIG. 5, a second embodiment of the game controller illustrates an alternative embodiment of the first embodiment. Accordingly, the left control stick 11, direction key 12, and right stick 14 are interchangeable controlling units respectively, while the function key 13 is stationary provided on the casing 10 such that the function key 13 cannot be detached therefrom. Relatively, the main body 100 of the casing 10 comprises three terminal seats 102 for receiving the three interchangeable controlling units mentioned above. The structure of the interchangeable controlling units and the terminal seats 102 are the same as the first embodiment.

Figure 6:
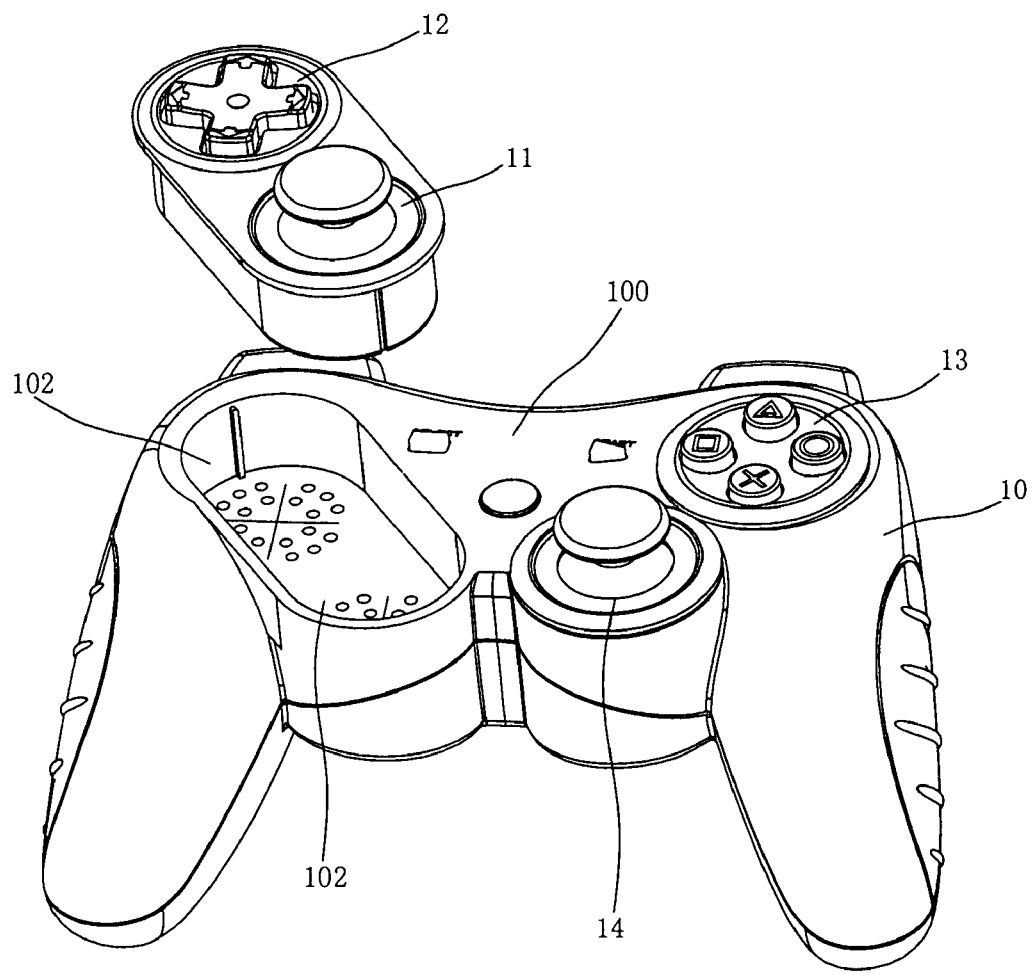
FIG. 6 is an exploded perspective view of the game controller according to a third preferred embodiment of the present invention.

As shown in FIG. 6, a third embodiment of the game controller illustrates another alternative embodiment of the first embodiment.

Accordingly, the left control stick 11 and direction key 12 are embodied as two interchangeable controlling units, while the function key 13 and the right control stick 14 are stationary provided on the casing 10, such that the function key 13 and the right control stick 14 cannot be detached from the casing 10. According to the preferred embodiment, the left control stick 11 and direction key 12 are integrally formed in one piece control member with an elongated structure. The main body 100 of the casing 10 comprises two terminal seats 102 for receiving the two the function key 13 and the right control stick 14 mentioned above. In particularly, the two terminal seats 102 are integrated to form an elongated cavity for the control member detachably coupling thereat. In other words, the positions of the left control stick 11 and direction key 12 can be interchangeably switched by turning the control member.

In conclusion, in the gamepad of the present invention, all or at least two of the left control stick 11, the direction key 12, the function key 13, and the right stick 14 can be formed as the interchangeable controlling units which are detachable from the casing 10. Therefore the positions of these controlling units can be interchanged according to the control configurations of the electronic game and the player's habit to satisfy different requirements of different electronic games and different players.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A game controller, comprising:
a casing;
a control circuit module received in said casing for operatively linking to a game console;
a plurality of controlling units, wherein at least two of said controlling units form as two interchangeable controlling units respectively which are detachable from said casing; and
a controller interchanging arrangement, which comprises:
a plurality of terminal seats spacedly provided on said casing, wherein each of said interchangeable controlling units is selectively and detachably mounted at said casing at one of said terminal seats to electrically couple with said control circuit module so as to selectively relocate said interchangeable controlling units at said casing, wherein the number of said terminal seats are corresponding to the number of said interchangeable controlling units to be interchangeably mounted at said casing;
a plurality set of first connectors provided at each of said terminal seats to electrically extend from said control circuit module, wherein the number of each set of said first connectors at each of said terminal seats are corresponding to the number of said interchangeable controlling units; and
a plurality of second connectors provided at said interchangeable controlling units and electrically engaged with one set of said first connectors when said interchangeable controlling unit is detachably mounted at said respective terminal seat;
wherein each of said terminal seats has a plurality of quadrants, wherein the number of said quadrants is corresponding to the number of said interchangeable controlling units, wherein each set of said first connectors is provided at each of said quadrants of said terminal seat, such that two or more sets of said first connectors are provided at each of said terminal seats.

2. The game controller, as recited in claim 1, wherein said first and second connectors are contact terminals such that when said interchangeable controlling unit is detachably mounted at said respective terminal seat, said first and second connectors are electrically contacted with each other to electrically connect said interchangeable controlling unit with said control circuit module.

3. The game controller, as recited in claim 2, wherein all of said terminal seats have the same quadrant arrangement of said first connectors to be distributed.

4. The game controller, as recited in claim 3, wherein said first connectors are provided at a bottom wall of each of said terminal seats while said second connector is provided at a bottom side of said interchangeable controlling unit to align with said first connector when said interchangeable controlling unit is detachably mounted at said terminal seat.

5. The game controller, as recited in claim 4, wherein each of said terminal seats is indentedly formed on said casing to form a cavity thereat, wherein each of said interchangeable controlling units comprises a plugging body extended downwardly to slidably and detachably engaged with said cavity of said terminal seat.

6. The game controller, as recited in claim 5, wherein each of said plugging bodies has a cylindrical shape and each of said terminal seats has a corresponding cylindrical shape to receive said plugging body thereat.

7. The game controller, as recited in claim 6, wherein said interchangeable controlling units are selected from the group consisting of a left control stick, a direction key, a function key, and a right control stick, a START key, a SELECT key, and a plurality of firing keys.

8. The game controller, as recited in claim 7, wherein said controller interchanging arrangement further comprises a positioning ridge vertically protruding from a side wall of each of said terminal seats and a positioning slot vertically formed on an outer wall of said each of said interchangeable controlling units for said positioning ridge slidably engaging with said positioning slot so as to ensure a correct alignment said second connectors and said corresponding set of said first connectors.

9. The game controller, as recited in claim 1, wherein all of said terminal seats have the same quadrant arrangement of said first connectors to be distributed.

10. The game controller, as recited in claim 1, wherein said first connectors are provided at a bottom wall of each of said terminal seats while said second connector is provided at a bottom side of said interchangeable controlling unit to align with said first connector when said interchangeable controlling unit is detachably mounted at said terminal seat.

11. The game controller, as recited in claim 1, wherein each of said terminal seats is indentedly formed on said casing to form a cavity thereat, wherein each of said interchangeable controlling units comprises a plugging body extended downwardly to slidably and detachably engaged with said cavity of said terminal seat.

12. The game controller, as recited in claim 1, wherein said interchangeable controlling units are selected from the group consisting of a left control stick, a direction key, a function key, and a right control stick, a START key, a SELECT key, and a plurality of firing keys.

13. The game controller, as recited in claim 1, wherein said controller interchanging arrangement further comprises a positioning ridge vertically protruding from a side wall of each of said terminal seats and a positioning slot vertically formed on an outer wall of said each of said interchangeable controlling units for said positioning ridge slidably engaging with said positioning slot so as to ensure a correct alignment between said second connectors and said corresponding set of said first connectors.

* * * * *